United States Patent [19]

Sybel et al.

[11] Patent Number: 4,524,345
[45] Date of Patent: Jun. 18, 1985

[54] SERIAL COMPARISON FLAG DETECTOR

[75] Inventors: Randall Sybel, Marlboro; Daniel Schwarzkopf, Stow, both of Mass.

[73] Assignee: Prime Computer, Inc., Natick, Mass.

[21] Appl. No.: 466,208

[22] Filed: Feb. 14, 1983

[51] Int. Cl.³ ............................................. G06F 7/02
[52] U.S. Cl. .................................................. 340/146.2
[58] Field of Search ..................................... 340/146.2

[56] References Cited

U.S. PATENT DOCUMENTS 3,760,355 9/1973 Bruckert ........................... 340/146.2
3,801,956 4/1974 Braun et al. ...................... 340/146.2
4,205,302 5/1980 Godo ................................ 340/146.2

OTHER PUBLICATIONS

Brown, "Programmable Character Recognizing Circuit" *Western Electric Technical Digest*, No. 19, Jul. 1970, pp. 15-16.
*PAL Programmable Array Logic Handbook*, Monolithic Memories, Apr. 1978, pp. 5-59 thru 5-66.

*Primary Examiner*—David H. Malzahn
*Attorney, Agent, or Firm*—Louis Orenbuch

[57] ABSTRACT

A high speed arrangement for detecting the occurrence of a flag character in a stream of serial digital data signals employs a pattern register in which are stored the bits of the referene flag pattern. As each bit of the serial data is received, it is simultaneously compared by a set of comparators with each of the bits in the flag pattern. The first comparator of the set compares the data bit with the first bit of the flag pattern and each successive comparator compares the data bit with the next successive bit in the pattern. The outputs of the comparators are coupled to corresponding stages of a shift register in the same ordered sequence as the comparators. All the stages of the shift register are arranged to be simultaneously clocked by clock signals. Each stage of the shift register is coupled to the next stage by a gate that permits the shift of a logic bit from the preceding stage to the succeeding stage only when the preceding stage was previously set by a signal from a comparator indicating the occurrence of a match between a data bit and a pattern bit and the gate receives a signal from the next comparator in the set indicating the occurrence of a match between the next data bit and the next pattern bit.

9 Claims, 5 Drawing Figures

SERIAL COMPARISON FLAG DETECTOR

FIELD OF THE INVENTION

This invention relates in general to the transmission and processing of digital electrical signals. More particularly, the invention pertains to apparatus for identifying the occurrence of a specified sequence of digital signals in a serial stream of digital signals.

BACKGROUND OF THE INVENTION

In the processing of digital electrical signals which are transmitted as a series of digital data signals, it is often necessary to monitor the stream of serial incoming data to detect the occurrence of a known data sequence identifying a delimiting character or flag. The delimiting character or flag is a string of digital signals arranged in a predetermined pattern. A flag character, for example, may be a byte consisting of 8 bits. The detection of a flag character has many uses in digital data processing as, for example where the detection of a flag is employed to actuate, interrupt, or modify the operation of associated equipment.

Heretofore the detection of a flag character or flag in a serial data stream has been accomplished by converting the serial data to parallel form and comparing that parallel data with the specified pattern being sought in the data stream. Thus for example, where a flag character of 8 bits is sought, each 8 bit sequence in the serial data stream is converted to parallel form and then compared with the parallel output signals of a register in which the specified pattern is stored. Where the serial data stream is simultaneously monitored for the occurrence of a number of different flag characters, the prior art parallel comparison arrangement may require the employment of additional sets of comparators.

SUMMARY OF THE INVENTION

The invention resides in apparatus that detects flag characters in serial data signals by performing comparisons as each bit of the serial data is received without first converting the serial incoming data signals to parallel form. In the operation of that apparatus, a sequence of digital bits identifying the flag character is stored in a register. The apparatus can be programmed to detect any sought for flag character by changing the digital bits stored in the register to the pattern designating that flag character. As each bit of serial data is received, it is compared simultaneously with all the bits in the memory register holding the designated pattern. The outputs of the comparators are applied to a shift register having at least as many stages as there are bits in the designated pattern. The register is arranged so that a bit cannot be shifted along the register unless a bit has been set in the preceding stage of the register. For example, when the first bit of the serial data signals is received, it is compared with all the bits of the designated pattern. If that first data bit matches the first bit of the pattern, a logic bit, for example, a ONE bit, is set in the first stage of the register. The other stages of the register are unaffected because no previous stage of the register was set. On receipt of the next data bit, it is compared with all the bits of the designated pattern. If the comparison of that data bit with the second bit of the pattern is true, the logic ONE in the first stage is shifted to the second stage. If the simultaneous comparison of the second data bit with the first bit of the pattern is true, a logic ONE is set in the first stage of the register; if that comparison is false, the first stage is not set. Upon receipt of the third data bit, it is compared with all the bits of the designated pattern. If the comparison with the third bit of the pattern is true, the logic ONE in the second stage is shifted to the third stage and at the same time, if there is a logic ONE in the first register stage and if the comparison of the third data bit with the second pattern bit is true, the logic ONE is shifted from the first stage to the second register stage. At the same time, another logic ONE is set in the first register stage only if the comparison of the third data bit with the first pattern bit is true. Because each incoming serial data bit is compared in its turn to all the pattern bits simultaneously and causes a set (ONE) bit to advance to the next register stage only if previous data bits successively matched previous pattern bits, the apparatus recovers immediately from a sequence of data signals whose last few bits only do not match the designated pattern without losing a true occurrence of the sought for pattern which may be displaced by only a few data bits from the partially matching sequence.

THE DRAWINGS

The invention, both as to its arrangement and its mode of operation can be better understood from the following exposition when it is considered in conjunction with the accompanying drawings in which FIG. 1 schematically depicts a prior art flag detector which converts serial data to parallel form and then compares the parallel data with the reference flag pattern;

FIG. 2 schematically depicts an embodiment of the invention which compares each data bit, in its turn, with the bits of the reference flag pattern;

FIG. 3 schematically depicts an embodiment of the invention which compares each data bit, in its turn, with the compliments of the flag pattern bits; and FIG. 4 schematically shows the logic structure of a register PAL device employed in the FIG. 3 embodiment.

FIG. 5 schematically depicts an arrangement of AND and OR gates which performs the same logical functions as the arrangement of EX-NOR and AND gates in the FIG. 2 embodiment.

PRIOR ART FLAG DETECTOR

Referring now to FIG. 1, there is shown a prior art arrangement for detecting a flag character in a serial data stream. In that arrangement, the serial digital data is clocked into the shift register 1 and is shifted from stage to stage along the register at the clock rate. Assuming for the purpose of exposition that the flag character to be detected in the serial data stream is a byte of eight bits, the bit pattern of the flag character is loaded into an eight stage pattern register 2. Each stage of the pattern register supplies one input to a corresponding one of a set of exclusive NOR gates 3, 4, 5, 6, 7, 8, 9, 10. The other input to each exclusive NOR gate is supplied from a corresponding stage of shift register 1. The output of each exclusive NOR gate in the set is applied to an AND gate 11. The abbreviation EX-NOR is hereinafter used to designate an exclusive NOR gate.

When the first eight bits of the serial data stream have been clocked into shift register 1, all eight bits are compared in parallel with the eight bits in the pattern generator 2 by the set of EX-NOR gates. If the eight data bits in the shift register match the pattern of bits in register 2, the outputs of all the EX-NOR gates are logic HIGHs, whereupon the AND gate emits a logic HIGH signal to indicate the detection of a flag character in the serial data stream. Where the eight data bits in the shift register do not match the pattern of bits in register 2, the output of AND gate 11 remains a logic LOW. The next data bit in the digital stream is clocked into the shift register to provide another set of eight parallel signals to the set of EX-NOR gates and another comparison with the pattern of bits in register 2 is performed. Thus the prior art arrangement operates by first converting the serial bits of the digital data stream into parallel form and then performing simultaneous comparisons with all the bits in the pattern register. Where high speed processing of digital data is an important consideration, the delays introduced by the gates in the prior art arrangement are a major disadvantage.

DETAILED DESCRIPTION OF THE INVENTION

Figure 2:
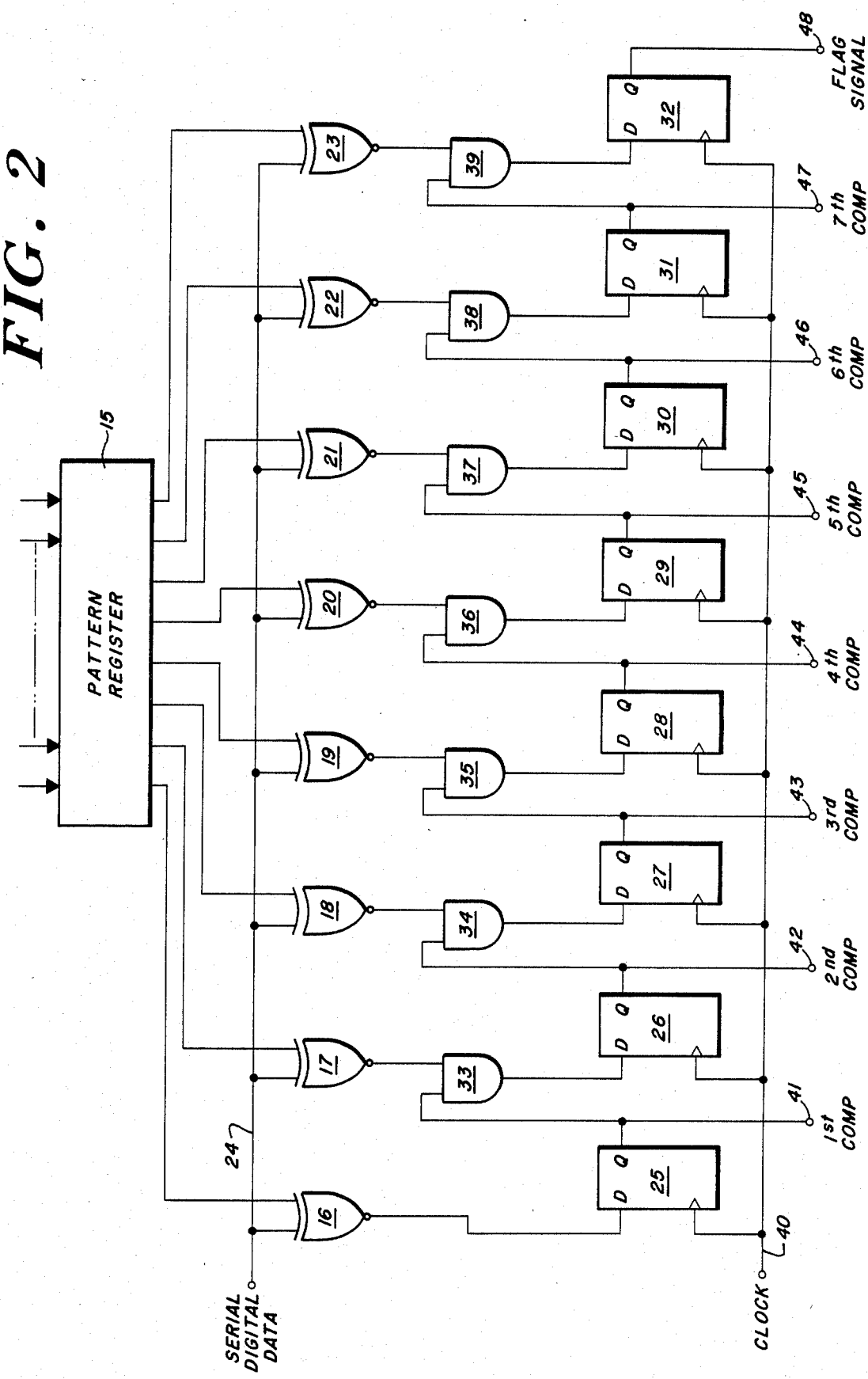

Referring now to FIG. 2, the arrangement of an embodiment of the invention is schematically shown. In that embodiment, the pattern of bits designating the flag character to be sought in the serial digital data stream is stored in pattern register 15. To enable that register to be quickly programmed, the bits of the pattern can be entered in parallel into the pattern register. It is again assumed for the purpose of exposition that the flag character is designated by an eight bit pattern. In that circumstance, the pattern register 15 has at least eight stages. Each stage of that pattern register supplies an input to a corresponding one of a set of EX-NOR gates 16, 17, 18, 19, 20, 21, 22, 23. The other input to each EX-NOR gate of the set is obtained from line 24 on which the serial digital data signals are transmitted. Thus each bit of the serial data received on line 24 is simultaneously compared by the set of EX-NOR gates with all the bits in pattern register 15. Where the data bit matches the pattern bit, the EX-NOR gate emits a logic ONE signal to the input of a D type flip-flop. Where the data bit does not match the pattern bit the EX-NOR gate emits a logic ZERO signal to the flip-flop's D input. The D type flip-flops 25, 26, 27, 28, 29, 30, 31, 32 form the stages of a shift register. Each stage of that register is connected to the next stage by an AND gate. As shown in FIG. 2, the stages of the shift register are serially connected by AND gates 33, 34, 35, 36, 37, 38, 39. Each AND gate receives an input from the preceding flip-flop stage and has its output connected to the D input of the succeeding flip-flop stage. The first stage of the shift register obtains its input from the output of EX-NOR gate 16. The output of the next EX-NOR gate 17 is applied to an input of AND gate 33 and the outputs of the other EX-NOR gates are connected in like manner to the inputs of the other AND gates. All the stages of the shift register are simultaneously clocked by clock signals applied to clock input line 40.

In the initial condition of the shift register, all the flip-flops 25 to 32 are in the unset stage and those flip-flops emit logic ZERO signals to the inputs of the AND gates. When a flip-flop is in the set stage the Q output of that flip-flop emits a logic ONE to the input of the AND gate. Each bit in the serial data stream, upon its arrival, is compared with all the pattern bits in pattern register 15 by EX-NOR gates 16 to 23. Assuming the first bit in the serial data stream matches the first pattern bit, EX-NOR gate 16 emits a logic ONE signal to the D input of flip-flop 25. Upon being clocked by the clock signal on line 40, the flip-flop is set and its Q output emits a logic ONE signal to AND gate 33. All the other stages of the shift register are unaffected because their flip-flops were in the unset state when clocked. A logic ONE output appearing at terminal 41 indicates a match with the first bit of the stored pattern.

Assuming the second bit in the serial data stream matches the second pattern bit, EX-NOR gate 17 emits a logic ONE to AND gate 33 whose other input also receives a logic ONE from flip-flop 25. Consequently, AND gate 33 emits a logic ONE signal to the D input of flip-flop 26 and the next occurring clock pulse causes the flip-flop to be set. Upon being set, flip-flop 26 emits a logic ONE to the input of AND 34 and to terminal 42. The logic ONE at terminal 42 signifies that the first two data bits match the first two pattern bits. If the second data bit also matches the first pattern, EX-NOR gate 16 emits a logic ONE to the D input of flip-flop 25 which causes that flip-flop to be set when clocked. If, however, the second data bit does not match the first pattern bit, NOR gate 16 emits a logic ZERO and consequently flip-flop 25 reverts to its unset state when clocked.

On the arrival of the third data bit in the serial stream, that bit is simultaneously compared with all the bits in pattern register 15. If that third data bit matches the third pattern bit, EX-NOR gate 18 emits a logic ONE to AND gate 34 whose other input receives a logic ONE from the Q output of flip-flop 26. Consequently, upon being clocked, flip-flop 27 emits a logic ONE signal to AND gate 35 and to terminal 43. The ONE signal at terminal 43 signifies that the first three data bits match the first three pattern bits. Thus it can be seen that the logic ONE entered into flip-flop 25 on the first match is shifted along the register with each successive match of serial data bits with the pattern bits. Where all eight consecutive serial data bits match the eight pattern bits, flip-flop 32 emits a logic ONE to output terminal 48 to signify the detection of a flag character. In addition, the appearance of a logic ONE at terminal 48 can be employed to provide bit synchronizing information.

Assuming the first seven consecutive data bits match the first seven pattern bits so that flip-flop 31 is set and emits a logic ONE to AND gate 39, and assuming the eighth data bit does not match the eighth pattern bit, EX-NOR gate 23 emits a logic ZERO to AND gate 39 which prevents the shift of the logic ONE in flip-flop 31 to flip-flop 32. Consequently, the output at terminal 48 remains at logic ZERO to indicate that detection of a flag character has not yet occurred. Inasmuch as each incoming serial data bit is compared to all the pattern bits simultaneously, but permits the shift of a logic ONE to the appropriate stage of the shift register only if previous data bits matched previous pattern bits, the apparatus recovers immediately from an incomplete match without losing a complete match that closely follows the partially matching sequence.

It can be appreciated that each logic ONE in the shift register indicates consecutive matching comparisons with the reference pattern for as many bits as the logic ONE has advanced through the stages of the shift register. For example where logic ONE signals are simultaneous present at terminals 46, 44, and 42, the logic ONE at terminal 46 indicates six consecutive matching comparisons have occurred, the logic ONE at terminal 44 includes four consecutive matching comparisons have occurred, and the logic ONE at terminal 42 indicates that two consecutive matching comparisons have occurred.

A major advantage of this serial comparator is that its complexity increases only linearly with the length of the reference pattern which it compares with serial data. If, for example, the reference pattern has twelve bits, it is necessary to add only four more flip-flops, AND gates, and EX-NOR gates to the eight shown in FIG. 2 embodiment and to use a pattern register having a minimum of twelve stages. Comparisons of different lengths can easily be made merely by tapping the shift register at different stages. For example, by tapping the shift register at terminal 46, a comparison whose length is six pattern bits is made whereas by tapping the shift register at terminal 48, a comparison whose length is eight pattern bits is made.

Figure 5:
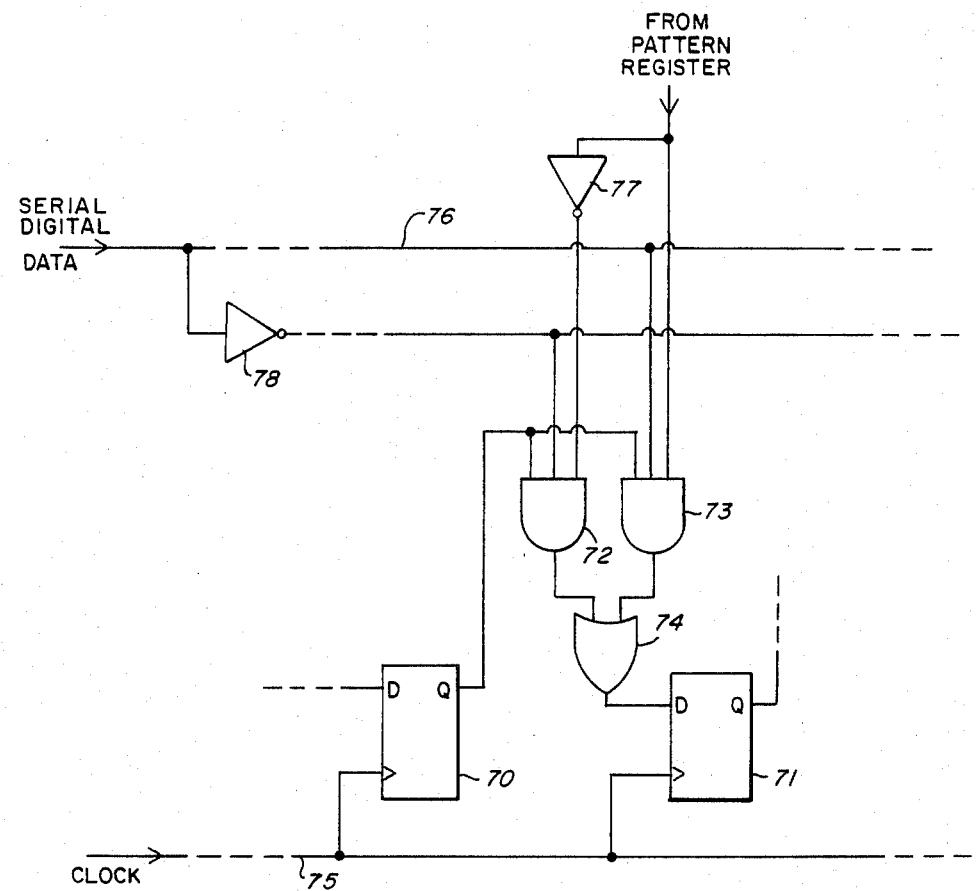

The logical functions performed by the EX-NOR and AND gates in the FIG. 2 embodiment can be implemented by the arrangement of AND and OR gates shown in FIG. 5. In the FIG. 5 embodiment, the Q output of D-type flip-flop 70 in one stage of the shift register is connected to the D input of flip-flop 71 in the next stage of that register by AND gates 72, 73 and OR gate 74. The outputs from AND gates 72 and 73 supply the inputs to OR gate 74 and the output of that OR gate is applied to the D input of flip-flop 1. As in the FIG. 2 embodiment, all the register flip-flops in the FIG. 5 embodiment are simultaneously clocked by clock signals transmitted on line 75. The incoming serial data on line 76 is applied as an input to AND gate 73 which also receives an input from the appropriate stage of the pattern register. That pattern bit signal from the pattern register is inverted by inverters 77 and applied as input to AND gate 72. The incoming serial digital data bit on line 76 is inverted by inverter 78 and applied as an input to AND gate 72.

The arrangement of AND and OR gates shown in FIG. 5 is generally faster than the FIG. 2 arrangement and the FIG. 5 arrangement is simpler to implement with large scale integrated (LSI) circuit technology.

Figure 1:
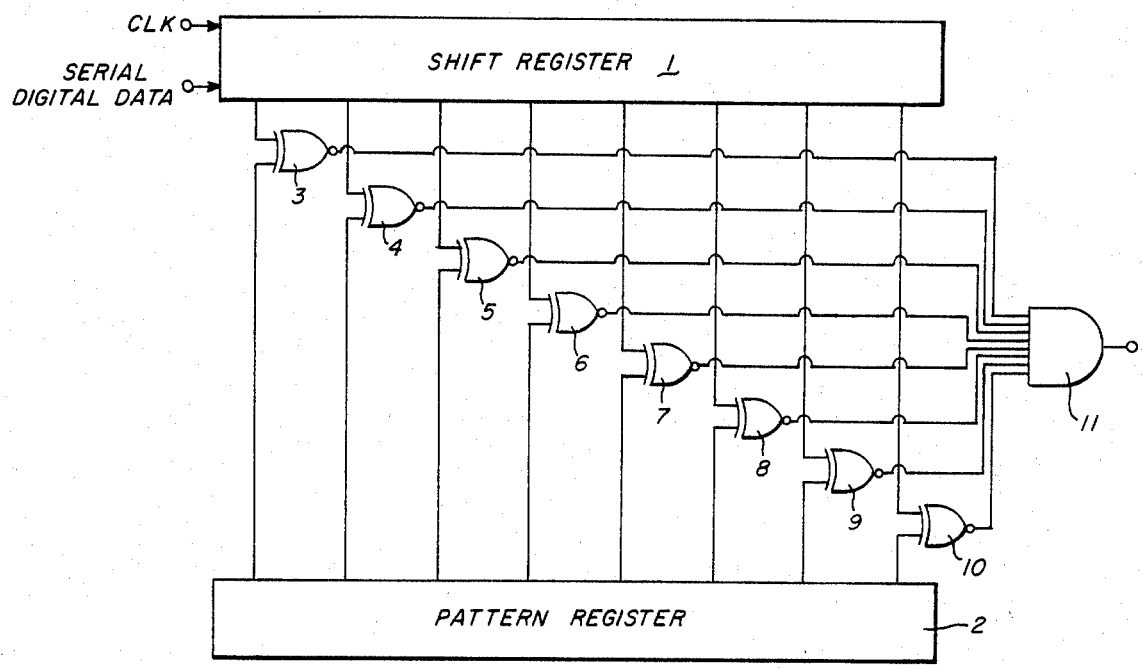
Figure 3:
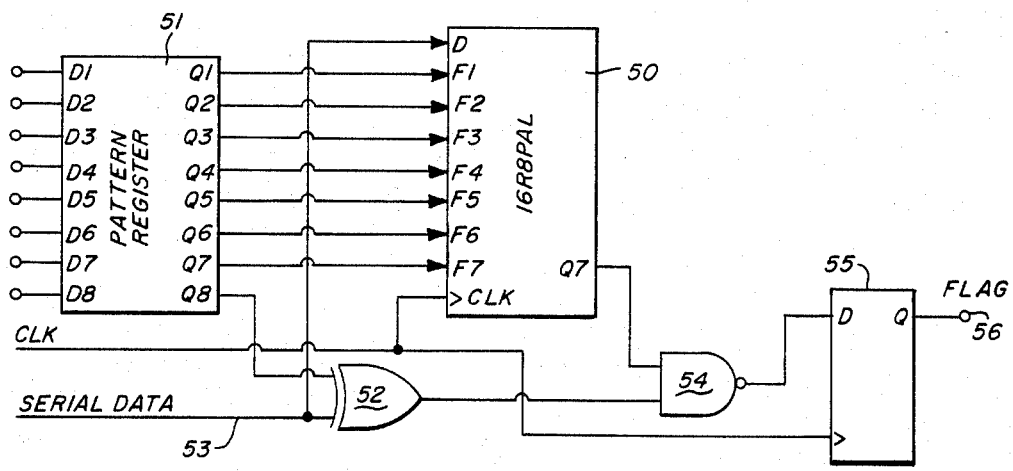

Referring now to FIG. 3, an embodiment of the invention is schematically shown that employs a device, sold under the trademark PAL, having a programmable array of logic gates. Conversion of logic functions into the PAL format is accomplished quickly and easily using a software tool sold under the trademark PA-LASM. Both PAL and PALASM are trademarks of Monolithic Memories, Inc. The PAL devices and the manner of programming those devices are described in the PAL Databook pusblished by the National Semiconductor Corporation of Santa Clara, Calif. That PAL Databook is here incorporated by reference thereto.

Figure 4:
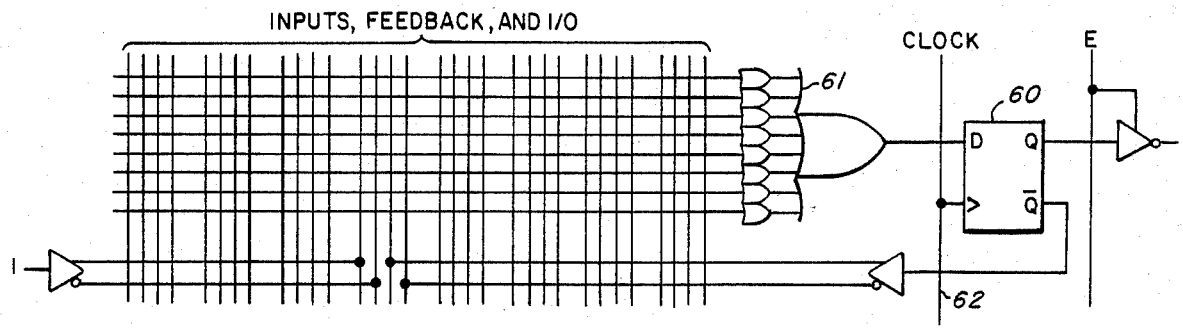

Block 50 in the FIG. 3 embodiment designates a 16R8PAL register device. The logic structure of a register PAL is shown in FIG. 4. The unique feature of the register PAL is the D-type flip-flop register element 60 following each AND-OR gate 61. A common clock input 62 latches data into all flip-flop register elements simultaneously on the rising edge of the clock pulse. A significant feature of the register PAL is the feedback path from the $\overline{Q}$ output of the flip-flop register element to the AND gate matrix. The 16R8PAL has eight register elements and consequently that device can provide eight outputs from the register.

Appendix A is the PAL assembler for programming the 16R8PAL for use in the FIG. 3 embodiment together with a fuse pattern map. In that fuse pattern map, each dash mark (—) indicates a blown fuse for a total number of 606 blown fuses. The X's indicate connections left intact.

A suitable device for the pattern register 51 shown in FIG. 3 is a 74LS273 unit. The 74LS273 unit has eight D-type flip-flops and is arranged to accept eight parallel input signals at terminals D1 to D8 whereby an 8 bit pattern can be quickly loaded into the register. In this embodiment of the invention, the pattern register 51 is loaded with the complement of the flag pattern and emits eight signals from terminals Q1 to Q8. Seven of those signals are applied to input terminals F1 to F7 of the 16R8PAL register device. The serial bits of the incoming data signals appearing on line 53 are applied to the D input of the PAL register device 50 and the D-type flip-flops register elements in that register are all simultaneously clocked by clock signals applied to the CLK terminal. Inasmuch as the 16R8PAL device has only eight data input signal terminals and it is necessary to use one of those terminals to input the serial data into that device, the eighth pattern bit from pattern register 51 is applied as one input to an exclusive OR gate 52. The other input is to that exclusive OR gate is obtained from line 53 on which the serial data is transmitted. The output of exclusive OR gate 52 is applied to an input of NAND gate 54. The other input to that NAND gate is furnished by the last stage of the seven stage 16R8PAL register. The output of NAND gate 54 is connected to the D input of flip-flop 55 which emits a flag signal from its output 56 when a flag character in the serial data stream is detected. The operation of the FIG. 3 embodiment is equivalent to the operation of the D FIG. 2 embodiment except that the FIG. 3 embodiment compares the incoming serial data with the complement of the flag pattern. From a logic design standpoint, the FIG. 3 embodiment can easily be changed to compare the serial data bits with the flag pattern bits instead of their complements and the FIG. 2 embodiment can be easily changed to compare the serial data bits with the complements of the flag pattern bits.

APPENDIX A

PAL ASSEMBLER
PAL SET NAME: IDC1__FLGDET
AVAILABLE PAL TYPES ARE: PAL16L8, PAL16R4, PAL16R6 AND PAL16R8
ENTER PAL TYPE NO.: PAL16R8
EACH OF THE 20 PINS MUST BE ASSIGNED A NAME(VARIABLE)
WARNING PIN 10 AND 20 MUST BE ASSIGNED TO GROUND AND POWER SIGNALS
ENTER PIN NAME IN SEQUENTIAL ORDER: CLK D F7 F6 F5 F4 F3 F2 F1
GND /OE Q8 Q7 Q6 Q5 Q4 Q3 Q2 Q1
ENTER EQUATIONS, EACH STARTING ON NEW LINE
USE A BLANK LINE TO TERMINATE INPUT
/Q7:=/Q6 + D*F1 + /D*/F1
/Q6:=/Q5 + D*F2 + /D*/F2
/Q5:=/Q4 + D*F3 + /D*/F3
/Q4:=/Q3 + D*F4 + /D*/F4
/Q3:=/Q2 + D*F5 + /D*/F5
/Q2:=/Q1 + D*F6 + /D*/F6

APPENDIX A-continued

```
/Q1:=      D*F7 + /D*/F7
NUMBER OF FUSES BLOWN = 606
OPERATION CODES: P=PLOT H=HEX S=SHORT L=BHLF N=BPNF M=MAP
K=SAVE(*K) R=RESTART Q=QUIT
ENTER OPERATION CODE: P
1DC1_FLGDET
X---  X---  ----  ----  ----  ----  ----  ----  D*F7
-X--  -X--  ----  ----  ----  ----  ----  ----  /D*/F7
XXXX  XXXX  XXXX  XXXX  XXXX  XXXX  XXXX  XXXX
XXXX  XXXX  XXXX  XXXX  XXXX  XXXX  XXXX  XXXX
XXXX  XXXX  XXXX  XXXX  XXXX  XXXX  XXXX  XXXX
XXXX  XXXX  XXXX  XXXX  XXXX  XXXX  XXXX  XXXX
XXXX  XXXX  XXXX  XXXX  XXXX  XXXX  XXXX  XXXX
XXXX  XXXX  XXXX  XXXX  XXXX  XXXX  XXXX  XXXX
---X  ----  ----  ----  ----  ----  ----  ----  /Q1
X---  ----  X---  ----  ----  ----  ----  ----  D*F6
-X--  ----  -X--  ----  ----  ----  ----  ----  /D*/F6
XXXX  XXXX  XXXX  XXXX  XXXX  XXXX  XXXX  XXXX
XXXX  XXXX  XXXX  XXXX  XXXX  XXXX  XXXX  XXXX
XXXX  XXXX  XXXX  XXXX  XXXX  XXXX  XXXX  XXXX
XXXX  XXXX  XXXX  XXXX  XXXX  XXXX  XXXX  XXXX
XXXX  XXXX  XXXX  XXXX  XXXX  XXXX  XXXX  XXXX
----  ---X  ----  ----  ----  ----  ----  ----  /Q2
X---  ----  ----  X---  ----  ----  ----  ----  D*F5
-X--  ----  ----  -X--  ----  ----  ----  ----  /D*/F5
XXXX  XXXX  XXXX  XXXX  XXXX  XXXX  XXXX  XXXX
XXXX  XXXX  XXXX  XXXX  XXXX  XXXX  XXXX  XXXX
XXXX  XXXX  XXXX  XXXX  XXXX  XXXX  XXXX  XXXX
XXXX  XXXX  XXXX  XXXX  XXXX  XXXX  XXXX  XXXX
XXXX  XXXX  XXXX  XXXX  XXXX  XXXX  XXXX  XXXX
----  ----  ---X  ----  ----  ----  ----  ----  /Q3
X---  ----  ----  ----  X---  ----  ----  ----  D*F4
-X--  ----  ----  ----  -X--  ----  ----  ----  /D*F4
XXXX  XXXX  XXXX  XXXX  XXXX  XXXX  XXXX  XXXX
XXXX  XXXX  XXXX  XXXX  XXXX  XXXX  XXXX  XXXX
XXXX  XXXX  XXXX  XXXX  XXXX  XXXX  XXXX  XXXX
XXXX  XXXX  XXXX  XXXX  XXXX  XXXX  XXXX  XXXX
XXXX  XXXX  XXXX  XXXX  XXXX  XXXX  XXXX  XXXX
----  ----  ----  ---X  ----  ----  ----  ----  /Q4
X---  ----  ----  ----  ----  X---  ----  ----  D*F3
-X--  ----  ----  ----  ----  -X--  ----  ----  /D*/F3
XXXX  XXXX  XXXX  XXXX  XXXX  XXXX  XXXX  XXXX
XXXX  XXXX  XXXX  XXXX  XXXX  XXXX  XXXX  XXXX
XXXX  XXXX  XXXX  XXXX  XXXX  XXXX  XXXX  XXXX
XXXX  XXXX  XXXX  XXXX  XXXX  XXXX  XXXX  XXXX
XXXX  XXXX  XXXX  XXXX  XXXX  XXXX  XXXX  XXXX
----  ----  ----  ----  ---X  ----  ----  ----  /Q5
X---  ----  ----  ----  ----  ----  X---  ----  D*F2
-X--  ----  ----  ----  ----  ----  -X--  ----  /D*/F2
XXXX  XXXX  XXXX  XXXX  XXXX  XXXX  XXXX  XXXX
XXXX  XXXX  XXXX  XXXX  XXXX  XXXX  XXXX  XXXX
XXXX  XXXX  XXXX  XXXX  XXXX  XXXX  XXXX  XXXX
XXXX  XXXX  XXXX  XXXX  XXXX  XXXX  XXXX  XXXX
XXXX  XXXX  XXXX  XXXX  XXXX  XXXX  XXXX  XXXX
----  ----  ----  ----  ----  ---X  ----  ----  /Q6
X---  ----  ----  ----  ----  ----  ----  X---  D*F1
-X--  ----  ----  ----  ----  ----  ----  -X--  /D*/F1
XXXX  XXXX  XXXX  XXXX  XXXX  XXXX  XXXX  XXXX
XXXX  XXXX  XXXX  XXXX  XXXX  XXXX  XXXX  XXXX
XXXX  XXXX  XXXX  XXXX  XXXX  XXXX  XXXX  XXXX
XXXX  XXXX  XXXX  XXXX  XXXX  XXXX  XXXX  XXXX
XXXX  XXXX  XXXX  XXXX  XXXX  XXXX  XXXX  XXXX
XXXX  XXXX  XXXX  XXXX  XXXX  XXXX  XXXX  XXXX
XXXX  XXXX  XXXX  XXXX  XXXX  XXXX  XXXX  XXXX
XXXX  XXXX  XXXX  XXXX  XXXX  XXXX  XXXX  XXXX
XXXX  XXXX  XXXX  XXXX  XXXX  XXXX  XXXX  XXXX
XXXX  XXXX  XXXX  XXXX  XXXX  XXXX  XXXX  XXXX
```

We claim:

1. Apparatus for detecting a flag pattern in a serial sequence of digital data signals, comprising
means for simultaneously providing bit signals corresponding to the bits in the flag pattern,
a plurality of comparators for simultaneously comparing each data signal in its turn with all the bit signals, each comparator being adapted to compare the data signal with a different one of the bit signals and emit a set signal upon the occurrence of a match,
a shift register having at least as many stages as there are bits in the flag pattern, the shift register being adapted to advance a logic signal from each set stage to the next stage in response to a clock signal,
the comparator which compares the data signal with the bit signal corresponding to the first bit in the flag pattern having its output applied to the input of the first stage of the shift register, a plurality of gates, each stage of the shift register being connected to the next succeeding stage by a different one of those gates, each gate obtaining one input from the output of a corresponding one of the comparators and obtaining another input from the preceding stage of the shift register, the comparator which compares the data signal with the bit signal corresponding to the second bit in the flag pattern providing the input signal to the gate connecting the first stage of the shift register to the second stage, the comparator which compares the data signal with the bit signal corresponding to the third bit in the flag pattern providing the input signal for the gate connecting the second stage to the third stage, the other gates and comparators being arranged in like manner in consecutive order corresponding to the order of the signal bits, and each gate enabling a logic signal to be shifted from the preceding stage of the shift register to the succeeding stage only if the preceding stage was previously set and a set signal is received by the gate from its comparator.

2. Apparatus according to claim 1, wherein
the means for simultaneously providing bit signals corresponding to the bits in the flag pattern is a register having at least as many stages as there are bits in the flag pattern.

3. Apparatus according to claim 1, wherein
the means for simultaneously providing bit signals corresponding to the bits in the flag pattern emits bit signals that are the complement of the bits in the flag pattern.

4. Apparatus according to claim 3, wherein,
each of the plurality of comparators comprises an exclusive OR gate.

5. Apparatus according to claim 1, wherein
each stage of the shift register comprises a D-type flip-flop and all those flip-flops are simultaneously clocked by a clock signal.

6. Apparatus according to claim 1, wherein
each of the plurality of comparators comprises an exclusive NOR gate.

7. Apparatus for detecting a flag pattern in a serial sequence of digital data signals, comprising
a plurality of detectors, each detector comparing each digital data signal in its turn in the serial sequence with a different one of the bits of the flag pattern and providing a match signal upon detection of a match between the bit and the data signal, a plurality of serially coupled signal storage means, each signal storage means being operative to provide an enable signal when a match signal is stored therein, each storage means being associated with a corresponding one of the detectors, the first storage means in the series responding to the occurrence of a match signal from its associated detector by storing the match signal and providing an enable signal to the next storage means in the series, each of the other storage means responding to the simultaneous occurrence of a match signal from its associated detector and an enable signal from the preceding storage means in the series by storing the match signal and providing an enable signal, and the enable signal of the last storage means in the series providing an indication that all the storage means in the series have match signals stored therein.

8. Apparatus according to claim 7, further including
means for simultaneously applying a clock signal to all the storage means in the series for causing the output of an enable signal from each storage means having a match signal stored in it.

9. Apparatus according to claim 7, wherein
the plurality of serially coupled signal storage means includes gate means interposed between consecutive storage means of the series.

* * * * *